(12) United States Patent
Rübsam et al.

(10) Patent No.: US 8,126,623 B2
(45) Date of Patent: Feb. 28, 2012

(54) SHIFTING DEVICE FOR A MANUAL TRANSMISSION

(75) Inventors: Christian Rübsam, Ketten (DE); Jan Sporleder, Goldbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 583 days.

(21) Appl. No.: 12/366,786

(22) Filed: Feb. 6, 2009

(65) Prior Publication Data

US 2009/0204300 A1     Aug. 13, 2009

(30) Foreign Application Priority Data

Feb. 6, 2008  (DE) .................. 10 2008 007 691

(51) Int. Cl.
*G06F 19/00* (2011.01)
(52) U.S. Cl. .............. 701/51; 74/335; 477/906; 701/55; 701/34
(58) Field of Classification Search .................... 701/55, 701/51, 34; 477/906; 192/98, 48.603, 48.606, 192/85.51, 85.54; 74/473.12, 335; 200/61.88, 200/11 G, 11 J
See application file for complete search history.

(56) References Cited

U.S. PATENT DOCUMENTS

| | | | |
|---|---|---|---|
| 4,621,328 A | 11/1986 | Arai et al. | |
| 5,525,768 A * | 6/1996 | Cobb et al. | 200/61.88 |
| 6,227,067 B1 | 5/2001 | Steeby et al. | |
| 6,785,599 B2 * | 8/2004 | Berger et al. | 701/51 |

FOREIGN PATENT DOCUMENTS

| | | |
|---|---|---|
| DE | 33313803 A1 | 11/1983 |
| DE | 10051210 A1 | 4/2002 |
| DE | 60024757 T2 | 8/2006 |

* cited by examiner

*Primary Examiner* — Behrang Badii
(74) *Attorney, Agent, or Firm* — Ingrassia Fisher & Lorenz, P.C.

(57) ABSTRACT

A shifting device is provided for the gear selection in a manual transmission that includes, but is not limited to a shift/selector lever that can be moved in a shifting degree of freedom and a selection degree of freedom, a measuring sensor for measuring a current position (s, w) of the shift/selector lever in the two degrees of freedom, a two-dimensionally controllable actuator device and a control circuit for the controlling of the actuator device in a position (S, W) which is associated with the sensed position (s, w) of the shift/selector lever, which depicts the movement region of the shift/selector lever on a region of possible positions of the actuator device. The movement region of the shift/selector lever included, but is not limited to a two-dimensional prohibited part region, in which the shift/selector lever is simultaneously moveable in both degrees of freedom. The control circuit depicts this prohibited part region on positions on an edge of the region of the possible positions of the actuator device.

10 Claims, 2 Drawing Sheets

SHIFTING DEVICE FOR A MANUAL TRANSMISSION

CROSS-REFERENCE TO RELATED APPLICATION

This application claims priority to German Patent Application No. 102008007691.0, filed Feb. 6, 2008, which is incorporated herein by reference in its entirety.

TECHNICAL FIELD

The present invention relates to a shifting device for the gear selection in a manual transmission with a shift/selector lever, a measuring sensor for sensing the position of the shift/selector lever and a control circuit which activates actuators by way of the sensed position of the shift/selector lever. Such a shifting device is generally termed shift-by-wire, since it replaces the conventional mechanical connection between shift/selector lever and an adjusting shaft or the like of the manual transmission through electrical signal transmission.

BACKGROUND

A shift-by-wire shifting device is known for example from DE 100 51 210 A1. It uses a shift lever that is moveable in a gate in two degrees of freedom, in the following designated as shift degree of freedom or selection degree of freedom. The gate has shifting and selecting paths which cross one another in the manner known from mechanical shifts. When the driver starts shifting and for this purpose moves the shift/selector lever from the end of a shifting path in the direction of the selection path, the control circuit is unable to detect if the driver intends a shift movement with or without path change, for as long as said driver does not start to displace the shift lever in the direction of the selection degree of freedom. In order to perform a shifting operation with path change in the shortest time possible, actuators for the shifting and selection movement are simultaneously actuated with this shifting device when the shift/selector lever is located at a crossing of shifting and selection paths and moves in the selection direction.

A problem of this type of control of the shifting operation is that the manual transmission allows simultaneous movements in shifting and selecting direction mostly only within very narrow limits. If these limits are exceeded the transmission jams. While upon manual shifting the driver can feel such jamming by a resistance of the shift/selector lever and accordingly can correct the lever movement, such a possibility is not present with a shift-by-wire shifting device. The paths of the shifting gates must therefore be toleranced closely in order to exclude jamming, but this renders the shifting operation difficult for the driver.

In view of the foregoing, at least one object of the invention is to state a shift-by-wire shifting device which securely prevents jamming of the shifted transmission even with generously toleranced guidance of the shift/selector lever. In addition, other objects, desirable features and characteristics will become apparent from the subsequent summary and detailed description, and the appended claims, taken in conjunction with the accompanying drawings and this background.

SUMMARY

Based on a shifting device with a shift/selector lever moveable in a shifting degree of freedom and a selection degree of freedom, a measuring sensor for sensing a current position of the shift/selector lever in the two degrees of freedom, a two-dimensionally controllable actuator device and a control circuit for steering the actuator device in a position associated with the sensed position of the shift/selector lever which depicts the movement region of the shift/selector lever on a region of possible positions of the actuator device, and the movement region of the shift/selector lever comprises a two-dimensionally prohibited part region in which the shift/selector lever is moveable simultaneously in both degrees of freedom, the above-mentioned object is solved in that the control circuit depicts this prohibited part region on positions on an edge (i.e., a one-dimensional part region) of the region of the possible positions of the actuator device.

This edge is practically adapted to a transmission shifted by the shifting device so that positions that can lead to a jamming of the transmission are reliably located outside the region of the possible positions of the actuator device. Shape and configuration of the prohibited region are hardly subject to restrictions, its shape and position are practically selected so that it allows the driver rapid movement of the shift/selector lever even upon path change.

Preferentially the control circuit is designed to depict each point of a permitted part region of the movement region uniquely on a position in the region of the possible positions of the actuator device, preferentially in such a manner that the ratio between the distance of two points of the movement region and the distance of their image positions is always finite in the region of the possible positions of the actuator device and unlike zero.

In order to allow rapid shifting the shift/selector lever is simultaneously moveable in both degrees of freedom preferentially in at least one part of the permitted region. According to the gate shape known per se the allowed region preferentially comprises a strip extending in the direction of the selection degree of freedom and strips extending in the direction of the shifting degree of freedom.

The prohibited region is particularly effective in order to make possible for the driver accelerated movement of the shift/selector lever or facilitate the shifting when it borders on a crossing of the strips, more preferably when two prohibited regions border each other on a crossing of the strips located diametrically opposite each other.

The control circuit can depict every point of the prohibited region for example on the same position of the actuator device on which it also depicts the point of the allowed region which is next adjacent to every point. Thus an image position of the actuator device is uniquely associated with each point of the prohibited region.

It is particularly preferred that the control circuit depicts each point of the prohibited region on the same position of the actuator device on which it also depicts a point of the allowed region which has a coordinate value in common with the point of the prohibited region.

In practice there are usually two such points, preferentially the control circuit forms the point in the prohibited region on the same image position each as in an edge point of the strip from which the shift/selector lever is previously engaged in the prohibited region.

Engaging the shift/selector lever in the prohibited region is a sure sign that the driver intends a shifting movement with path change. In order to be able to perform this one shifting movement without path change rapidly, the control circuit upon a movement of the shift/selector lever tracks the common coordinate value of the actuator device slower in the prohibited region than in the permitted region.

BRIEF DESCRIPTION OF THE DRAWINGS

The present invention will hereinafter be described in conjunction with the following drawing figures, wherein like numerals denote like elements, and:

FIG. 4 a second top view of the shifting gate with a modified arrangement of the prohibited regions and the course of a shifting movement resulting there from.

DETAILED DESCRIPTION

The following detailed description is merely exemplary in nature and is not intended to limit application and uses. Furthermore, there is no intention to be bound by any theory presented in the preceding background and summary or the following detailed description.

Figure 1:
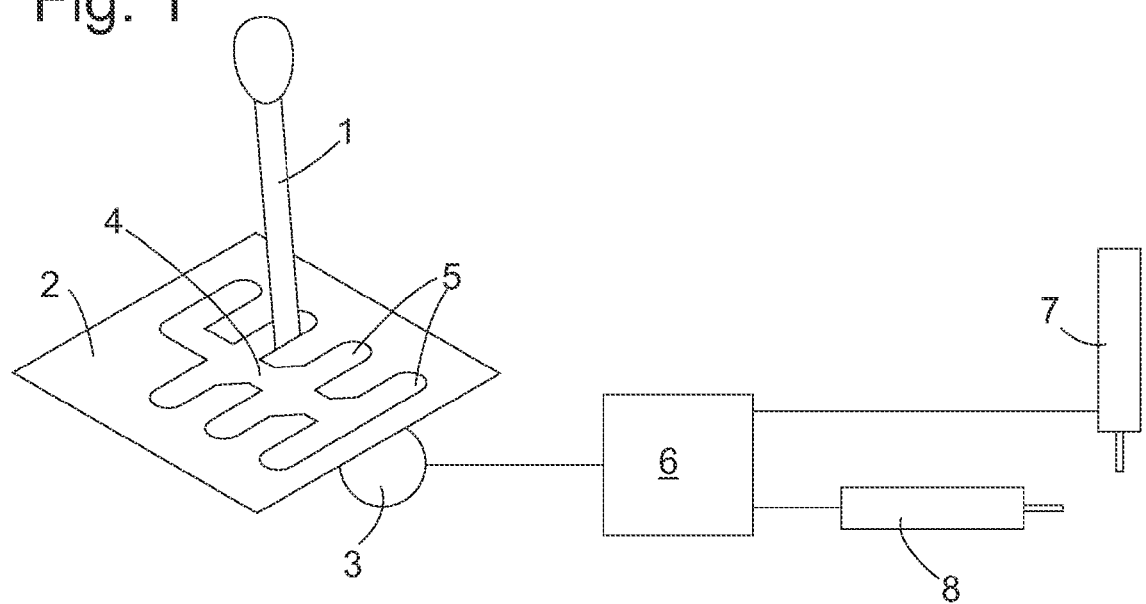
FIG. 1 is a schematic representation of a shifting device according to an embodiment of the invention.

The shifting device schematically shown in FIG. 1 comprises a shift/selector lever 1 which protrudes into the passenger cell of a motor vehicle and is guided in a gate plate 2 and a sensor 3 for sensing the position of the shift/selector lever 1 in two degrees of freedom, in the direction of a selection path 4 cut out in the gate plate 2 and in the direction of the shifting paths 5 crossing the selection path 4. The sensor 3 supplies coordinate values of the shift/selector lever 1 with respect to these two directions to an electronic control circuit 6. An actuator device with two degrees of freedom, here shown as two individual actuation cylinders 7, 8 is connected to the control circuit 6. The actuation cylinders 7, 8 drive a shifting movement in two degrees of freedom such as for example axial displacement and rotation of a shifting shaft of a stepped transmission known per se which is not shown.

For as long as the shift/selector lever 1 is located in one of the paths 4 or 5 the control circuit 6 determines a desired position of the actuation cylinder 7 for the shifting movement by means of the coordinate of the shift/selector lever 1 in shifting path direction supplied by the sensor 3, regardless of the selection path coordinate and a desired position of the actuation cylinder 8 by means of the selection path coordinate and independent of the shifting path coordinate. The shifting and selection paths 4, 5 stretched along in a straight line are dimensioned so that each position the shift/selector lever 1 can assume in the shifting or selection paths is depicted by the control circuit 6 on a permissible position of the actuation cylinders 7, 8 (i.e., on a position that can be actually set on the stepped transmission and does not lead to malfunctioning).

Figure 2:
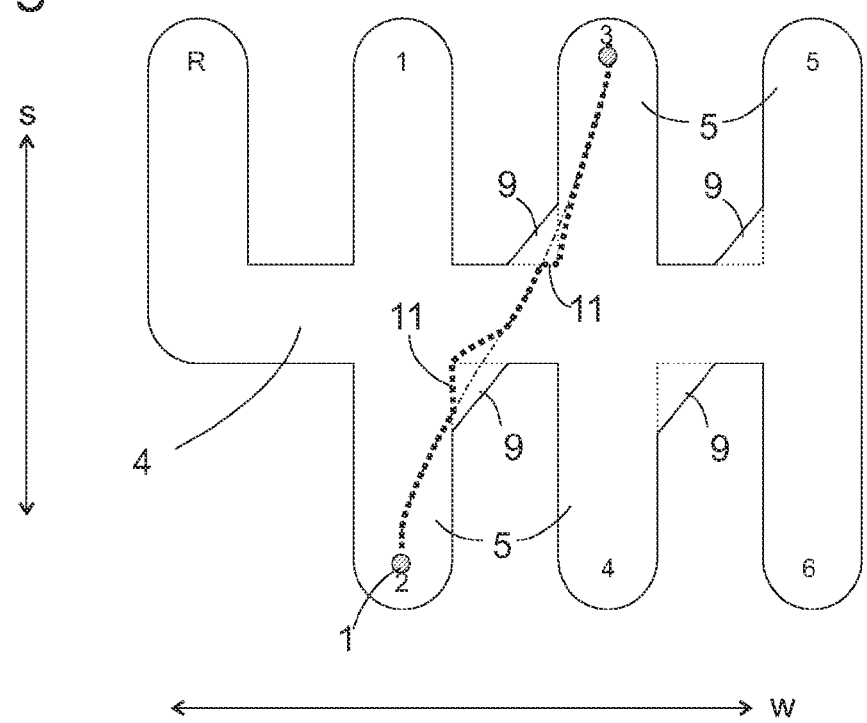
FIG. 2 is a shifting gate in which a shift/selector lever of the shifting device according to an embodiment of the invention can be moved, the prohibited regions that exist within the gate and the resulting course of a shifting movement resulting from the shape and position of these prohibited regions.

The enlarged top view of the gate plate shown in FIG. 2 shows that the shift/selector lever 1, when it is located in one of the shifting paths 5, has play in selection direction and if it is located in the selection path 4, has play in shifting direction. Since the control circuit 6, when the shift/selector lever 1 for instance at the start of a shifting movement is located at the end of a shifting path 5 during the control of the selection movement actuation cylinder 8, does not take into account the coordinate of the shift/selector lever 1 in the shifting direction, a movement of the shift/selector lever 1 in selection direction within the context of the play of the shifting path 5 results in a corresponding movement of the actuation cylinder 8.

Triangular sections 9 are recessed from the gate plate 2 adjacent to crossing points of the selection and shifting paths 4, 5 which are neither associated with the shifting paths nor the selection paths. As is shown in FIG. 2 by means of a dash-dotted line these sections 9 substantially facilitate the adjustment of the shift/selector lever 1 between two adjacent gears, here the second and the third gear, with change of the shifting path 5. The path change can be completed without the direction of the shift/selector lever 1 having to be abruptly changed upon reaching of the selection path 4.

However, it is difficult to design a manual transmission so that when the desired positions of the two actuation elements 7, 8 are each determined independently of each other by means of the coordinates of the shift/selector lever 1 measured by the sensor 3 in shifting and selection direction, a reliable position of the transmission corresponds to each position which the shift/selector lever 1 can assume in one of the sections 9. Since consequently the sections 9, even if within these the actuation elements 7, 8 would only be controlled as a function of a single coordinate of the shift/selector lever 1, could not be approached in order to avoid malfunctioning, these sections 9 are also designated prohibited regions here.

Figure 3:
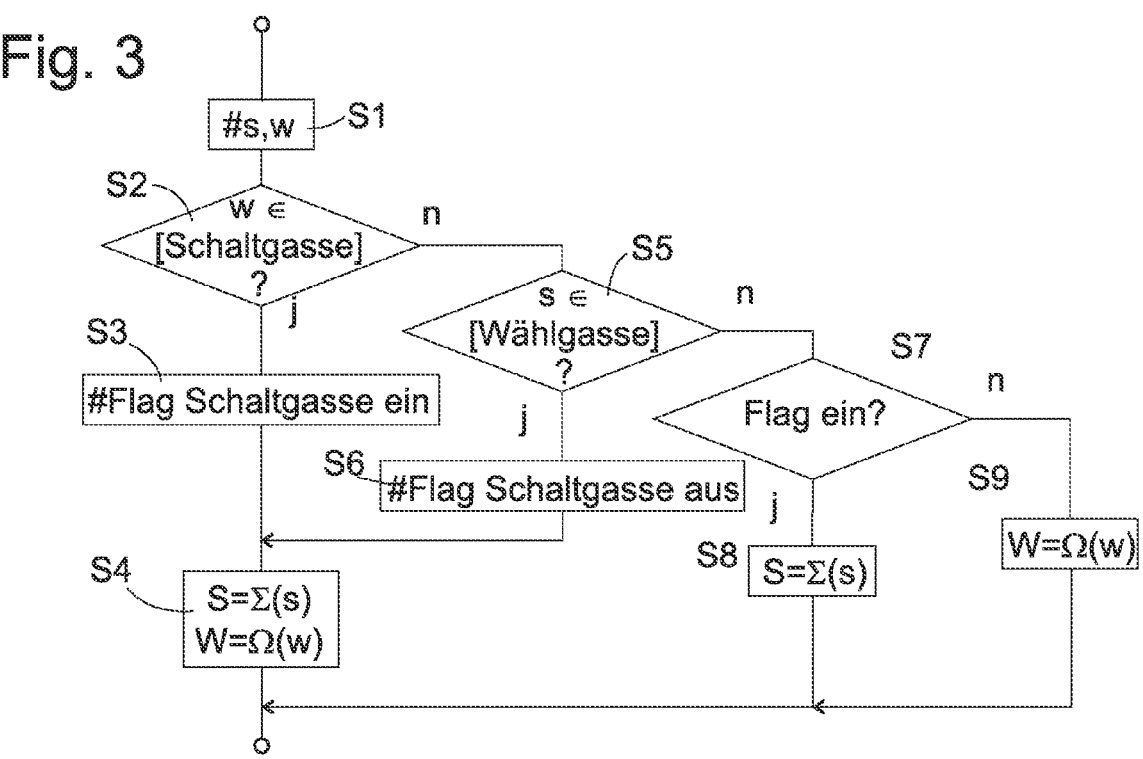
FIG. 3 is a flow diagram of a control method that takes place in the shifting device.

In order to prevent that upon passage of the shift/selector lever 1 through one of the sections 9, an impermissible position of the transmission is approached or it is attempted to approach such, the principle of the mutually independent control in the shifting and in the selection degree of freedom upon passage through one of the sections 9 is broken. A simple, efficient method for this is shown in the flow diagram of FIG. 3. In the diagram s each designates a coordinate of the lever 1 measured by the sensor 3 in the shift degree of freedom and w the coordinate of the lever 1 in the selection degree of freedom, $\Sigma$ a depiction encoded in the control circuit 6 which assigns a desired position S of the actuation cylinder 7 to the position s in the shift degree of freedom of the lever 1, and $\Omega$ a depiction encoded in the control circuit 6 which assigns the desired position W of the actuation cylinder 8 to the selection degree of freedom position w.

In step S1 the control circuit 6 reads the coordinate values s, w from the sensor 3. In step S2 it decides if the read coordinate value w can be reconciled with the assumption that the lever 1 is located in one of the shifting paths 5. If this is the case, a flag is set in S3 indicating this state. After this, the desired values S, W are calculated from the coordinate values s, w by means of the depictions $\Sigma$, $\Omega$.

When in step S2 the coordinate value w indicates that the lever 1 cannot be located in a shifting path 5 it is next checked in step S5 if the coordinate value s is reconcilable with the assumption that the lever 1 is located in the selection path 4. If yes, the flag is reset in step S6 and the method proceeds to step S4.

If it is discovered in step S5 that the shift/selector lever 1 is not located in the selection path 4 either, it can only be located in one of the prohibited regions 9. In this case step S7 checks the value of the shifting path flag set in a preceding iteration of the method. If it is set this indicates that the lever 1 has entered the prohibited region 9 from one of the shifting paths 4. In this case a new desired position S is merely determined for the shifting degree of freedom in step S8; the desired position W in the selection degree of freedom remains unchanged. If conversely it is determined in step S7 that the shifting path flag is not set, the lever 1 can only be engaged in the prohibited region 9 from the selection path 4; in this case a new desired position W is determined for the selection actuation cylinder 8 in step S9, that of the shift actuation cylinder 7 remains unchanged. The shifting path flag remains unchanged even in S8 or S9. For as long as the shift/selector lever 1 is located in the prohibited region 9 the flag therefore indicates from where it has been engaged, regardless how often the method is repeated in that time.

Based on this control a movement of the actuation cylinders 7, 8 drawn in as thick dash-dotted line results from the movement of the shift/selector lever 1 corresponding to the dash-dotted line in FIG. 2. While the lever 1 coming from the shift position of the second gear moves upwards and to the right within the shifting path 5 of that gear, the movement of the actuation cylinders 7, 8 truly follows that of the lever 1. When the lever 1 coming from the shifting path 5 of the first gear engages in one of the prohibited regions 9, the shifting path flag is set and only the desired value S is made to track the movement of the lever 1 through repeated execution of the step S8. This means the movement of the selection actuation cylinder 8 comes to a stop and only the shifting actuation cylinder 7 follows the movement of the lever. The movement of the actuation cylinders 7, 8 thus follows an upward course along the edge 11 of the prohibited region 9.

As soon as the lever 1 engages in the selection path 4 from the section 9 the shifting path flag is reset and the desired position of the selection actuation cylinder 8 is tracked so that the movements of the lever 1 and the actuation cylinders 7, 8 soon resume a congruent course.

Upon the second entry in a prohibited region 9, this time from the selection path 4, the tracking of the actuation cylinder 7 is partially interrupted and the path of the actuation cylinders 7, 8 runs a horizontal course along the edge 11 of the prohibited region 9 until the lever 1 engages in the shifting path 5 of the third gear. In this shifting path 5 the movements soon follow a congruent course again until the shifting position is reached.

As a further development of the method described above it can be provided that the speed with which the actuation cylinder 7 is made to track modified desired values S is variable, depending on whether the lever 1 is located within one of the shifting paths 5 or outside these. In that for instance the speed of the tracking of the shift actuation cylinder 7, when the lever 1 is engaged in a prohibited region 9 from a shifting path 5, is set lower than when the lever 1 is located in a shifting path 5, a shifting operation without path change can be carried out rapidly on the one hand, while overshooting of the shifting movement upon path change which could bring the transmission into an impermissible position is prevented on the other hand. The tracking speed of the shift actuation cylinder 7 remains on the low value until the lever 1 is again located in a shifting path 5.

In an analog manner various tracking speeds can be provided for the selection actuation cylinder 8 depending on whether it is located in the selection path 5 or not. For as long as the lever 1 is located at the end of a shifting path it is made to track small movements of the lever 1 in selection direction only slowly. Only on leaving the shifting path, for example upon entry in a prohibited region is it clear that a selection movement is actually demanded and the selection actuation cylinder 8 is rapidly made to track the current desired value W.

Figure 4:
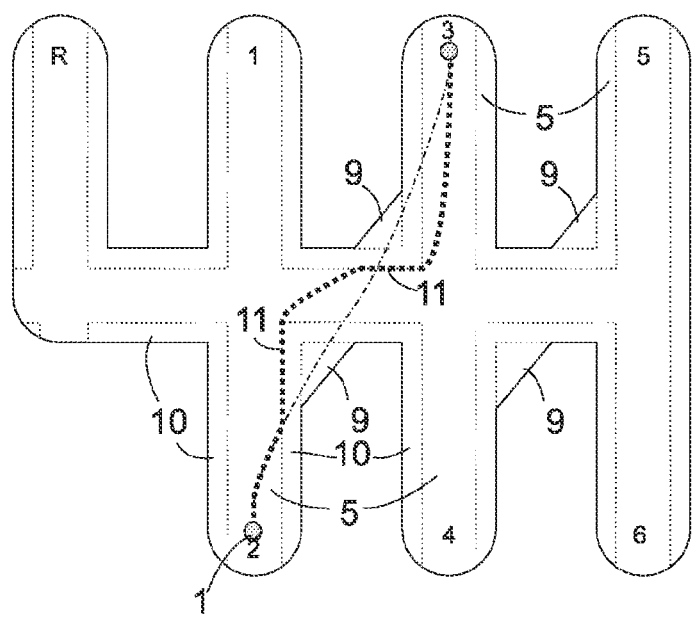

As is shown in FIG. 4, the coordinate intervals of the shifting and selection degree of freedom coordinates s, w, which are considered by the control circuit 6 as belonging to the selection path 4 or a shifting path 5, can also be predetermined more closely than corresponds to the actual width of the paths. A thin dotted line in FIG. 4 designates each of the boundaries of the coordinate region considered by the control circuit 6 as belonging to the paths 4, 5. Strips 10 along the longitudinal edges of the paths 4, 5 each do not belong to this. The path of the actuation cylinders 7, 8 in turn shown as a thick dotted line each runs along the edges 11 of the strips 10 in a manner similar to that described with reference to FIG. 2 as soon as the shifting/selection lever 1 enters one of these strips 10. So it is that a transmission requiring precision control can also be shifted by a shift/selector lever 1 which is guided with generous tolerances.

Here, too, the actuation cylinders 7, 8 as described above with reference to FIG. 3 can be made to track the movements of the shift/selector lever 1 with varying speeds, depending on the position of the shifting gate in which lever 1 happens to be located.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A shifting device for a gear selection in a manual transmission, comprising:
   a shift/selector lever moveable in a shifting degree of freedom and a selection degree of freedom;
   a measuring sensor adapted to sense a current position of the shift/selector lever in two degrees of freedom;
   a two-dimensionally controllable actuator device; and
      a control circuit adapted to control the two-dimensionally controllable actuator device in a position associated with a sensed position of the shift/selector lever, which depicts a movement region of the shift/selector lever on a region of possible positions of the two-dimensionally controllable actuator device,
   wherein the movement region of the shift/selector lever comprises a two dimensional prohibited part region in which the shift/selector lever can be simultaneously moved in both degrees of freedom, and
   wherein the control circuit depicts a prohibited part region on positions on an edge of the region of the possible positions of the two-dimensionally controllable actuator device.

2. The shifting device according to claim 1, wherein the control circuit uniquely depicts each point of a permitted part region of the movement region on a position in the region of the possible positions of the two-dimensionally controllable actuator device.

3. The shifting device according to claim 2, wherein in at least one part of a permitted region the shift/selector lever can be simultaneously moved in both degrees of freedom.

4. The shifting device according to claim 2, wherein a permitted region comprises a strip extending in a direction of a selection degree of freedom and strips extending in the direction of the shifting degree of freedom.

5. The shifting device according to claim 4, wherein the prohibited region borders on a crossing of the strips.

6. The shifting device according to claim 4, wherein two prohibited regions border on a crossing of the strips located diametrically opposite each other.

7. The shifting device according to claim 1, wherein the control circuit depicts each point of the prohibited region on a same position of the two-dimensionally controllable actuator device, as the point of an allowed region that is next adjacent to every point.

8. The shifting device according to claim 1, wherein the control circuit depicts each point of the prohibited region on the same position of the two-dimensionally controllable actuator device as a point of a permitted region which with the point of the prohibited region has a coordinate value in common.

9. The shifting device according to claim 8, wherein the point of the permitted region on an image position of which the control circuit depicts a point in the prohibited region is an edge point of that strip from which the shift/selector lever is engaged in the prohibited region.

10. The shifting device according to claim 9, wherein the control circuit upon a movement of the shift/selector lever in the prohibited region tracks a common coordinate value slower than in the permitted region.

* * * * *